Sept. 25, 1923.
R. W. SMITH
1,469,116
STARTING DEVICE FOR MOTOR CYCLES AND THE LIKE
Filed June 30, 1920   2 Sheets-Sheet 2
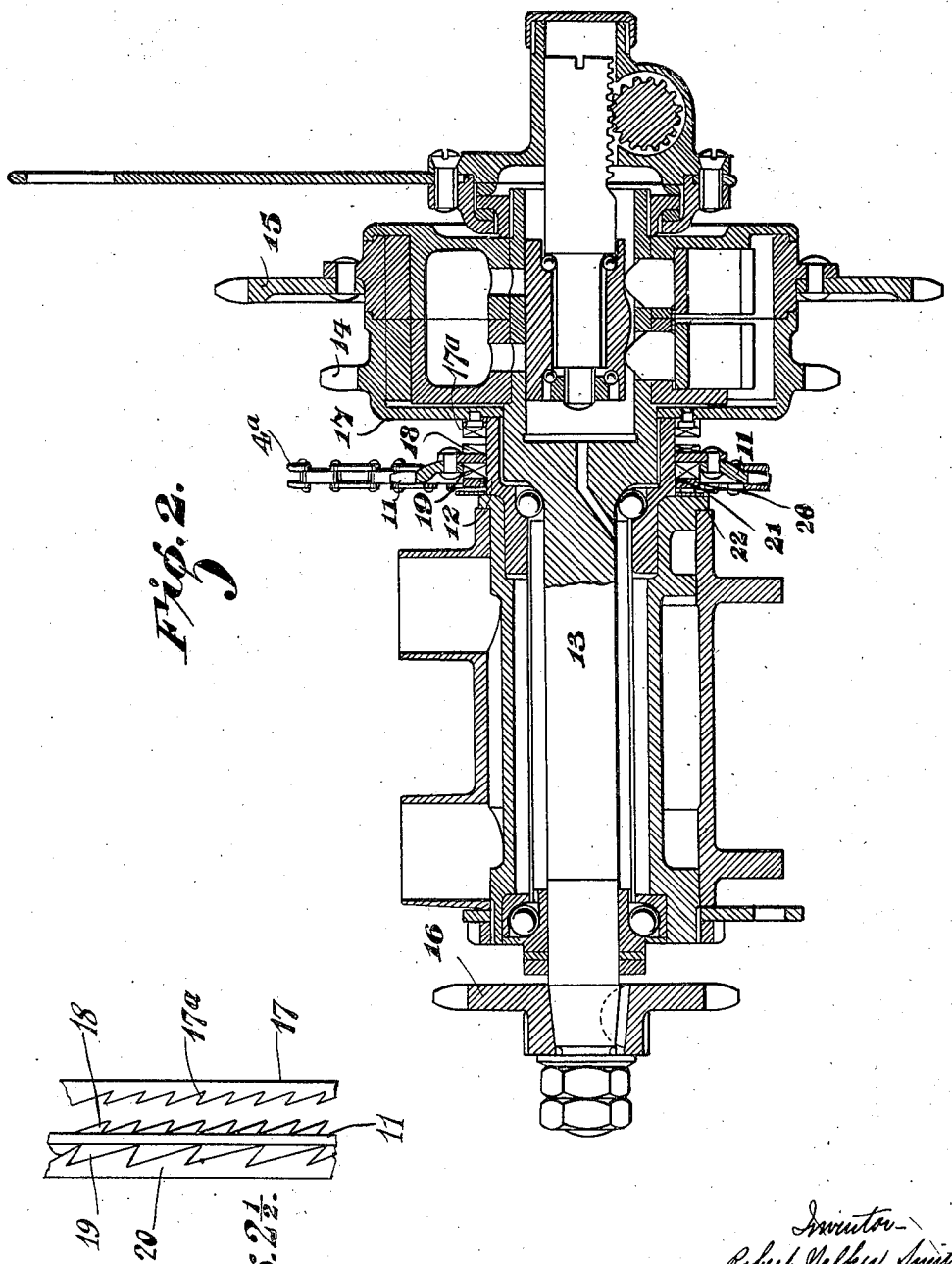

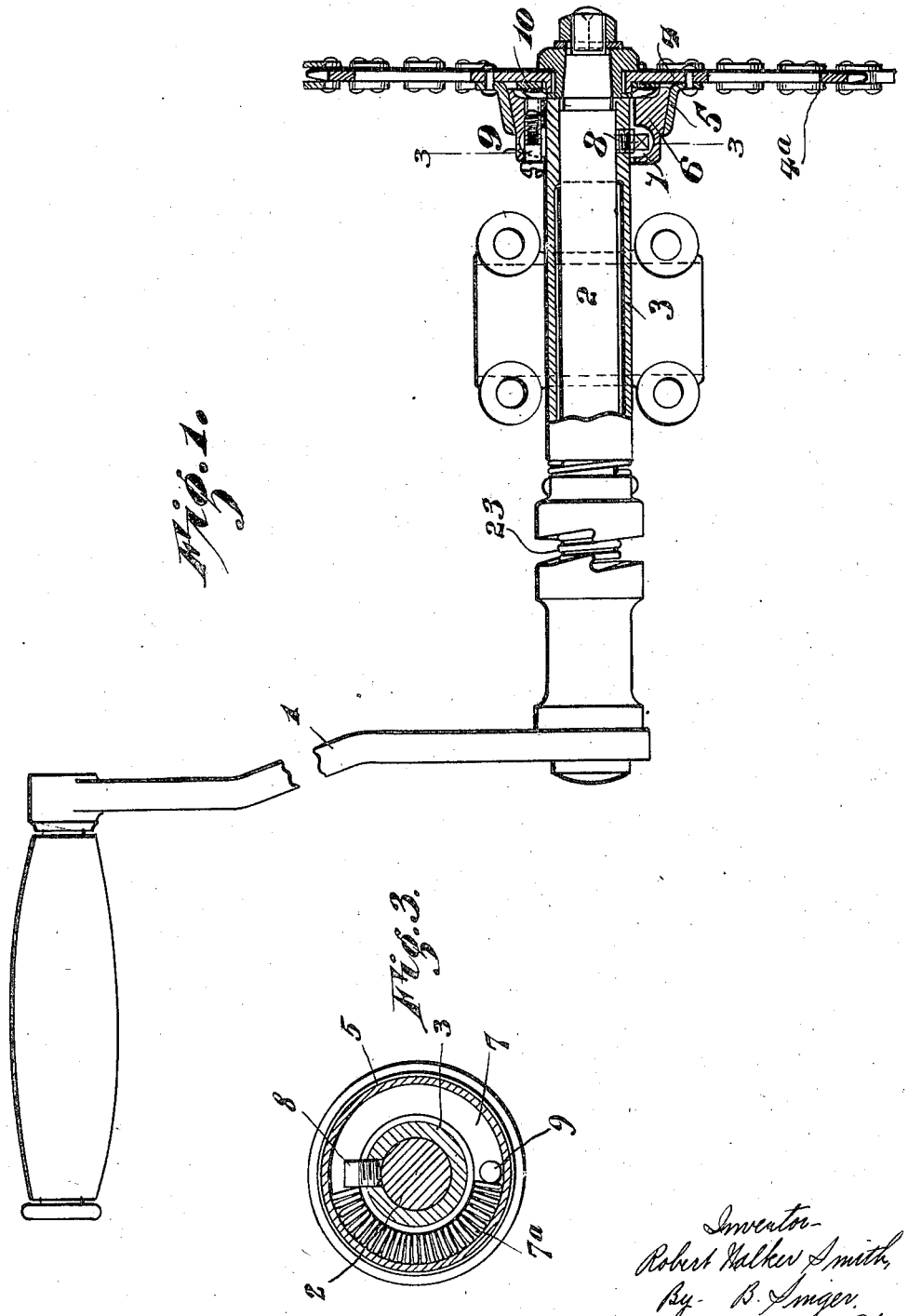

Patented Sept. 25, 1923.

1,469,116

UNITED STATES PATENT OFFICE.

ROBERT WALKER SMITH, OF REDDITCH, ENGLAND, ASSIGNOR OF ONE-HALF TO THE ENFIELD CYCLE COMPANY, LIMITED, OF REDDITCH, ENGLAND.

STARTING DEVICE FOR MOTOR CYCLES AND THE LIKE.

Application filed June 30, 1920. Serial No. 393,158.

*To all whom it may concern:*

Be it known that I, ROBERT WALKER SMITH, a subject of the Kingdom of Great Britain, residing at Enfield Works, Redditch, in the county of Worcester, England, have invented certain new and useful Improvements in or Relating to Starting Devices for Motor Cycles and the like (for which I have filed application for patent in Great Britain April 20, 1915, #5,920), of which the following is a specification.

This invention relates to starting devices for engines, of the type in which the starting power is imparted to the shaft to be started by a one-way clutch which has been of the ratchet tooth type and adapted to be automatically disengaged after starting, the one part of the ratchet tooth clutch having been axially moved into engagement in the operation of starting by virtue of inclined surfaces, and in which the arrangement is such that the axially movable part of the clutch has been axially disengaged after starting by the teeth of the clutch and has been normally retained out of engagement or contact with the other part of the clutch. Previously such an arrangement has only been used in connection with a primary starting arrangement of a type which is displaced and is adapted to return to its initial position, such as a kick-starter or a wheel rotated by pulling a rope against the resistance of a spring, and it is this return movement of the primary starting member to its initial position which serves to bring about the retention of the ratchet tooth clutch in its disengaged condition.

The present invention is designed for arrangements in which the primary starting handle or device is of the type adapted to be rotated continuously and in an unlimited degree, as differentiated from the kick-starter or equivalent type of oscillatory primary starting arrangement, and in order to provide the necessary rearward movement or rotation for bringing about the retention of the parts of a ratchet tooth starting clutch normally out of contact or engagement, means are provided whereby after the continuous operation of the primary starting member in an unlimited degree has been discontinued, said primary starting member or a part thereof is caused to rotate to an appropriate extent in a rearward direction.

The present invention may be used in connection with the various forms of starters, such as manual and electric starters to which it is suitably applicable, and the drive for starting may be imparted to a chain wheel laterally movable in relation to, and adapted to have ratchet tooth clutch connection with, a part to which the starting power is to be imparted. This chain wheel receives the starting motion through the medium of an endless chain, from another chain wheel mounted upon the primary starting handle shaft or other primary starting member, such other chain wheel constituting a part of the primary starting member which is, as aforedescribed, adapted after the starting power has been discontinued, to rotate to some small extent in a rearward direction, this being conveniently effected by the employment of a friction device and spring, the spring being constrained in the forward operation of the handle or primary starting chain wheel until the frictional resistance is overcome. When the power imparted to the chain wheel is discontinued, the latter rotates in a rearward direction under the influence of the spring which acts through the intermediate ring frictionally engaging with the chain wheel.

The laterally movable chain wheel adapted to have ratchet tooth clutch connection with the part to be started may rotate and slide axially upon a stationary boss, and this chain wheel has on its face opposite to the face having the clutch teeth, other ratchet teeth arranged in a reverse direction and adapted to co-operate with corresponding ratchet teeth upon a ring, which latter can rotate in relation to the boss, but this rotation is frictionally resisted by a spring. After the ratchet tooth clutch has been disengaged upon the starting of the engine, by virtue of the engagement of the inclined surfaces of its teeth, with the teeth upon the part to be started, the rearward movement of the primary starting member brings the vertical faces of the teeth on the other side of the chain wheel into such engagement with the corresponding faces of the teeth on the frictionally restrained ring, that the chain wheel is thereby held with its starting clutch teeth out of engagement with the starting clutch teeth upon the part to be started. The inclined surfaces of the teeth upon the frictionally resisted ring in co-operation with those on the chain wheel serve to provide for the axial movement of the latter into clutch engagement with the part to be started upon the forward operation of the primary starting device.

In order that this invention may be clearly understood and readily carried into practice, reference may be had to the appended explanatory two sheets of drawings, upon which:—

Figure 1 is a longitudinal sectional plan of a starting handle and chain wheel operated thereby in one form of primary starting device according to the present invention.

Figure 2 is a longitudinal sectional plan of a motor cycle countershaft and illustrating the chain wheel which receives motion from the chain wheel shown in Figure 1.

Fig. 2½ is a diagram showing the ratchet teeth 17ª, 18, 19 and 20.

Fig. 3 is a detail sectional view taken on the plane indicated by the line 3—3 of Fig. 1.

In a convenient embodiment of the present invention, 1 is a starting handle which is adapted to impart rotary motion to a shaft 2 suitably carried in a stationary sleeve 3. The shaft 2 rigidly carries a chain wheel 4. This chain wheel 4 rigidly carries the female member 5 of a coned friction device. The male member 6 of this coned friction divice encircles the sleeve 3. The member 6 is furnished with an internal annular groove 7 in which a coiled spring 7ª is disposed in such a manner as to be compressed in a circumferential direction. One end of the coiled spring bears against a stop 8 provided upon the sleeve 3, and the other end bears upon a stop 9 provided in the member 6. The member 6 is adapted to remain in frictional engagement with the member 5, as for instance by a spring washer 10 or other suitable means acting between the member 6 and the chain wheel 4. The arrangement is such that when the shaft 2 is rotated by the starting handle 1, the member 6 is first of all frictionally rotated a part of a revolution against the resistance of the coiled spring disposed in the groove 7, this occurring by reason of the frictional engagement between the parts 5 and 6, but after the spring has been compressed to a certain extent, the part 5 slips in relation to the part 6, at the same time retaining the latter in the position to retain the spring compressed so that the spring is retained in its compressed condition throughout the time during which the shaft 2 is rotated. When the rotation of the shaft 2 is discontinued and the handle 1 is released, the spring contained in the groove 7 expands and causes the chain wheel 4 to rotate to a small extent in a direction opposite to that in which it has been rotated by the handle. The chain wheel 4, shaft 2, and handle 1, constitute the primary starting device and in the form illustrated the chain wheel 4 and shaft 2 together constitute the part of the primary starting member which after starting is caused to rotate in a rearward direction. The starting handle 1 may be rigidly fixed to the shaft 2, in which case the starting handle also rotates, after starting, in a rearward direction, but in the form shown in the drawing the usual claw clutch 23 is provided between the handle 1 and shaft 2, as a result of which the handle 1 may not receive the rearward motion. The chain wheel 4 is geared by an endless chain 4ª with the chain wheel 11 shown in Figure 2. This chain wheel 11 is adapted to rotate and also have a slight axial movement upon a stationary sleeve 12. Within this sleeve 12 a spindle 13 is mounted. This spindle 13 is adapted to receive power from the engine through one or other of two chain wheels 14, 15, one or other of which is adapted to be clutched to the shaft 13 by any suitable mechanism at the will of the rider, to thereby provide a two-speed gear. At its other end the shaft 13 carries a chain wheel 16 which is in gear with a chain wheel on the rear road wheel of the bicycle. The chain wheel 14 constitutes the part to be started and has a web 17 which is contiguous to the stationary sleeve 12. To this web 17 is secured a ring 17ª of ratchet teeth, with which ratchet teeth 18 provided upon the chain wheel 11 are adapted to engage. This constitutes the starting clutch. When the ratchet teeth 18 are in engagement with the ratchet teeth on the wheel 14, and both of the wheels 14 and 15 are declutched from the shaft 13, rotation of the starting handle 1 has the effect of starting the wheel 14 and therefore the engine which drives both of the wheels 14, 15. Either of the wheels, 14, 15 can then afterwards be clutched to the shaft 13 to drive the latter either at a relatively high or a relatively low speed. After the wheel 14 has been started the ratchet teeth on the wheel 14 over-run those on the wheel 18, in which action the wheel 11 is moved axially away from the wheel 14.

At its other face the chain wheel 11 is furnished with ratchet teeth 19 which may be larger in pitch and depth than the teeth on the first face, and such other ratchet teeth are adapted to co-operate with ratchet teeth provided upon a ring 20 encircling the stationary carrier sleeve. Such last-mentioned ring can rotate and move axially upon the sleeve, both of which movements are frictionally resisted by a spring 21 incorporated within the ring and adapted to engage with the periphery of the stationary carrier sleeve. Between the ring last mentioned and a stationary shoulder or stop a spring washer 22 is incorporated.

When, therefore, the initial starting movement imparted to the chain wheel 11 is discontinued, such chain wheel is laterally or axially displaced away from the teeth to which the power has been imparted, and the teeth on the other side of the wheel pass into engagement with the frictionally restrained ring 20. The chain wheel 11 may rotate the frictionally restrained ring 20 rearwardly in some degree but upon completion of this rotation the vertical faces of the teeth 19 are held tightly against the vertical faces of the teeth on the ring 20 by the effort of the spring 7ª disposed between the stops 8 and 9 (Figure 1) and the chain wheel 11 is thereby held with its teeth 18 out of engagement with the teeth on the wheel 14. The last-mentioned faces of the teeth 19 and of the teeth on the ring 20 may, instead of being precisely vertical, be slightly undercut to ensure the desired retention of the wheel 11 from lateral or axial displacement.

When it is again desired to effect the operation of starting, the rotation imparted to the chain wheel causes the latter to move axially or laterally by reason of its teeth 19 sliding over the teeth of the frictionally retained ring 20, and the chain wheel is thereby displaced into engagement with the ratchet teeth upon the wheel 14.

What I claim as my invention and desire to secure by Letters Patent is:—

In starting mechanism, a clutch element having ratchet teeth on one side, a gear mounted for rotation and for lateral movement and having ratchet teeth on opposite sides, those on one side being arranged to engage those of said clutch element when said gear is moved laterally in one direction, a ring mounted for rotation and for lateral movement and having ratchet teeth to engage those on the other side of said gear, spring means to yieldingly and frictionally resist both rotation and lateral movement of said ring, and a spring washer to move said ring and gear toward said clutch element, in combination with a revoluble primary starting device, an element revoluble therewith, and means to impart reverse rotation to said element when the rotation of the primary device is discontinued, the last-named element being connected to and active to operate said gear.

In witness whereof I have hereunto set my hand.

ROBERT WALKER SMITH.